United States Patent [19]
Gartmann

[11] 3,889,985
[45] June 17, 1975

[54] PRESSURE COMPENSATED EXPANSION JOINT

[75] Inventor: Hans Gartmann, Trenton, N.J.

[73] Assignee: Swiss Corporation Limited, Willowdale, Canada

[22] Filed: Feb. 2, 1973

[21] Appl. No.: 328,923

Related U.S. Application Data

[63] Continuation-in-part of Ser. No. 327,456, Jan. 29, 1973, abandoned, which is a continuation of Ser. No. 76,151, Sept. 28, 1970, abandoned.

[52] U.S. Cl. .............. 285/95; 285/165; 285/261; 285/DIG. 1
[51] Int. Cl. ............................................. F16l 27/06
[58] Field of Search ........ 285/DIG. 1, 95, 106, 166, 285/167, 165, 261, 263, 97

[56] References Cited
UNITED STATES PATENTS

| | | | |
|---|---|---|---|
| 1,888,026 | 11/1932 | Chapman | 285/167 X |
| 2,421,691 | 6/1947 | Gibson et al. | 285/106 X |
| 2,976,064 | 3/1961 | Croy | 285/165 |
| 3,392,995 | 7/1968 | Swerdfeger | 285/DIG. 1 |
| 3,427,051 | 2/1969 | White et al. | 285/165 |
| 3,479,061 | 11/1969 | Smookler et al. | 285/263 X |
| 3,712,645 | 1/1973 | Herter | 285/DIG. 1 |

FOREIGN PATENTS OR APPLICATIONS 996,228   6/1965   United Kingdom................... 285/95

*Primary Examiner*—Thomas F. Callaghan
*Attorney, Agent, or Firm*—Smith, Harding, Earley & Follmer

[57] ABSTRACT

A compensated expansion and/or articulating joint for piping comprises a sleeve and ring means defining one or more annular chambers, the effective area of the chambers being determined by the cross-section of the piping. The chamber or chambers are in communication with the interior of the pipe, and the sleeve and ring or rings are arranged in such a way as to pull the pipes together to oppose the "end thrust". A solid outer ring simplifies construction. O-rings are used for sealing, and exterior dimensions may be minimized by using multiple annular chambers. Leakage may be prevented by the use of a diaphragm separating the interior of the pipe from an auxiliary fluid in communication with the expansion chamber. Articulating couplings with mating spherical engaging surfaces may include two annular, juxtaposed chambers, one of which is in pressure communication with the interior of the pipe, the other of which is vented to the ambience, thus largely avoiding indeterminate pressure profiles in the mating surfaces.

7 Claims, 9 Drawing Figures

PRESSURE COMPENSATED EXPANSION JOINT

CROSS-REFERENCE TO RELATED APPLICATIONS

This is a continuation-in-part of my copending application Ser. No. 327,456, filed Jan. 29, 1973 and now abandoned. Said application Ser. No. 327,456 was in turn a continuation of my application Ser. No. 76,151, filed Sept. 28, 1970, also abandoned.

BACKGROUND OF THE INVENTION

This invention relates to expansion and/or articulating joints of the kind used in conjunction with pipe lines and other conductors which handle liquids or gases.

When piping or ducting is subjected to higher than ambient temperatures and pressures, axial movement and/or mutual angulation of the piping may tend to take place as a combined result of temperature and pressure (or vacuum) effects.

Sometimes, minor inexpensive modifications can be made to the piping so that it can articulate, or can expand and contract axially, without imposing large forces on associated equipment. When pumping machinery is installed, it is particularly desirable to provide expansion and/or articulating joints in the suction and/or discharge piping to take care of thermal expansion and for ease of alignment of the pumping equipment. It is also desirable to provide means for compensating end thrust in such joints.

Prior art pressure-compensated expansion joints have involved the provision of sliding sleeve means defining an annular chamber which, when pressurized, urges the parts of the joint in the direction opposite to that resulting from the internal pipe pressure, but such prior constructions have generally required structure extending radially a considerable distance beyond the piping itself. Regarding prior art pressure-compensated articulating joints, it has generally been the case that undesirably large spherical sealing (and bearing) surfaces have been provided, surfaces which have had a large axially projected area and over which pressure profiles have been indeterminate. This has prevented the accurate computation of the required compensatory thrust, and of course has resulted in large frictional drag and heavy, unwieldy structure.

In the latter connection, reference may be had to U.S. Pat. No. 3,454,288, issued July 8, 1969 to Mancusi Jr., and entitled "Pressure-Balanced Swivel Pipe Coupling", which is exemplary of the swivel or articulating joints of the prior art, and which includes undesirably great spherical bearing surfaces having a large axially projected area, high friction, considerable bulk, and an indeterminate pressure profile.

SUMMARY OF THE INVENTION

In accordance with one facet of this invention, there is provided an expansion joint in which end thrust may be either partially or wholly compensated, while permitting the compensating structure to be located closely radially adjacent the piping of the joint. This construction is of particular advantage in aircraft or aboard ship, where it is often necessary to use piping having minimum outer dimensions.

The expansion joint in accordance with the invention has utility in such areas as natural gas transmission, municipal water pumping plants, chemical plants, in boiler feeding, and wherever pressure and temperature variations exist.

The simplicity of its construction results from the provision of a solid outer sleeve which defines the outer boundary of several annular chambers surrounding the fluid-carrying passage of the expansion joint.

Leakage is minimized by the use of O-ring or equivalent seals wherever relative sliding of parts can take place.

In installations where dangerous fluids are pumped under pressure, leakage can be virtually eliminated by the use of an expansion joint constructed in accordance with another facet of the invention and having a diaphragm separating the fluid-conducting passage from the expansion chambers.

The joint may be provided with a ratio transmitter connected between the fluid passage and the expansion chambers. The ratio transmitter permits the use of reduced chamber dimensions.

Finally, in order to facilitate installation of piping where adjoining pipes are not in axial alignment, or in order to allow variation in the angular relationship between the axes of adjoining pipes, a pressure-compensated piping joint in accordance with yet another facet of the invention may be provided, in which the spherical bearing area is held to a minimum, as is the axial projection of that area, and in which indeterminate pressure profiles are kept small enough to be neglected in the calculation of chamber sizes.

More particularly, one facet of this invention provides a compensated expansion joint for high pressure piping comprising: first and second fluid conductors arranged in communication with each other to provide a fluid passage, means providing a seal permitting sliding of said conductors relative to each other in the direction of flow, but preventing the escape of fluid at the connection between them, means providing a plurality of expansible chambers having relatively movable parts, means providing a direct pressure relationship between said fluid passage and the interior of the chambers, means fastening said first and second fluid conductors to said relatively movable parts so that said conductors are pulled toward each other as the expansible chambers expand.

Another facet of this invention provides a compensated expansion joint for high pressure piping comprising: first and second fluid conductors arranged in communication with each other to provide a fluid passage, means providing a seal permitting sliding of said conductors relative to each other in the direction of flow but preventing the escape of fluid at the connection between them, a flexible tubular diaphragm disposed in said fluid passage and sealed at one end to the first conductor and at the other end to the second conductor to provide a space for a pressure transmitting fluid within said conductors but outside said diaphragm, means providing at least one expansible chamber having relatively movable parts, means providing a passage allowing communication of pressure between the interior of the expansible chamber and the space within said fluid conductors but outside said diaphragm, and means fastening said first and second fluid conductors to said relatively movable parts so that said conductors are pulled toward each other as the expansible chamber expands.

According to another facet of this invention, a ratio transmitter may be provided having one end in communication with the central fluid passage, and having the other end in communication with the interior of one or more expansible chambers.

In accordance with another facet of this invention, a pressure-compensated articulated joint for piping is provided, comprising: first and second fluid conductors arranged with their ends connected articulably to each other to provide a fluid passage, the first fluid conductor having means defining an inwardly opening annular cavity with a base and two side walls, the second fluid conductor having an outwardly projecting flange received in said cavity and defining therewith a first and a second annular chamber, one on either side of said flange, concentric spherical bearing and sealing means between the flange and said base and between the second fluid conductor and the portions defining said two side walls, said first annular chamber being so disposed that pressure therein would urge said fluid conductors together, said second annular chamber being so disposed that pressure therein would urge said fluid conductors apart, means providing a direct pressure relationship between said first annular chamber and said fluid passage, and a vent connecting said second annular chamber with the ambience.

Figures 1, 5:
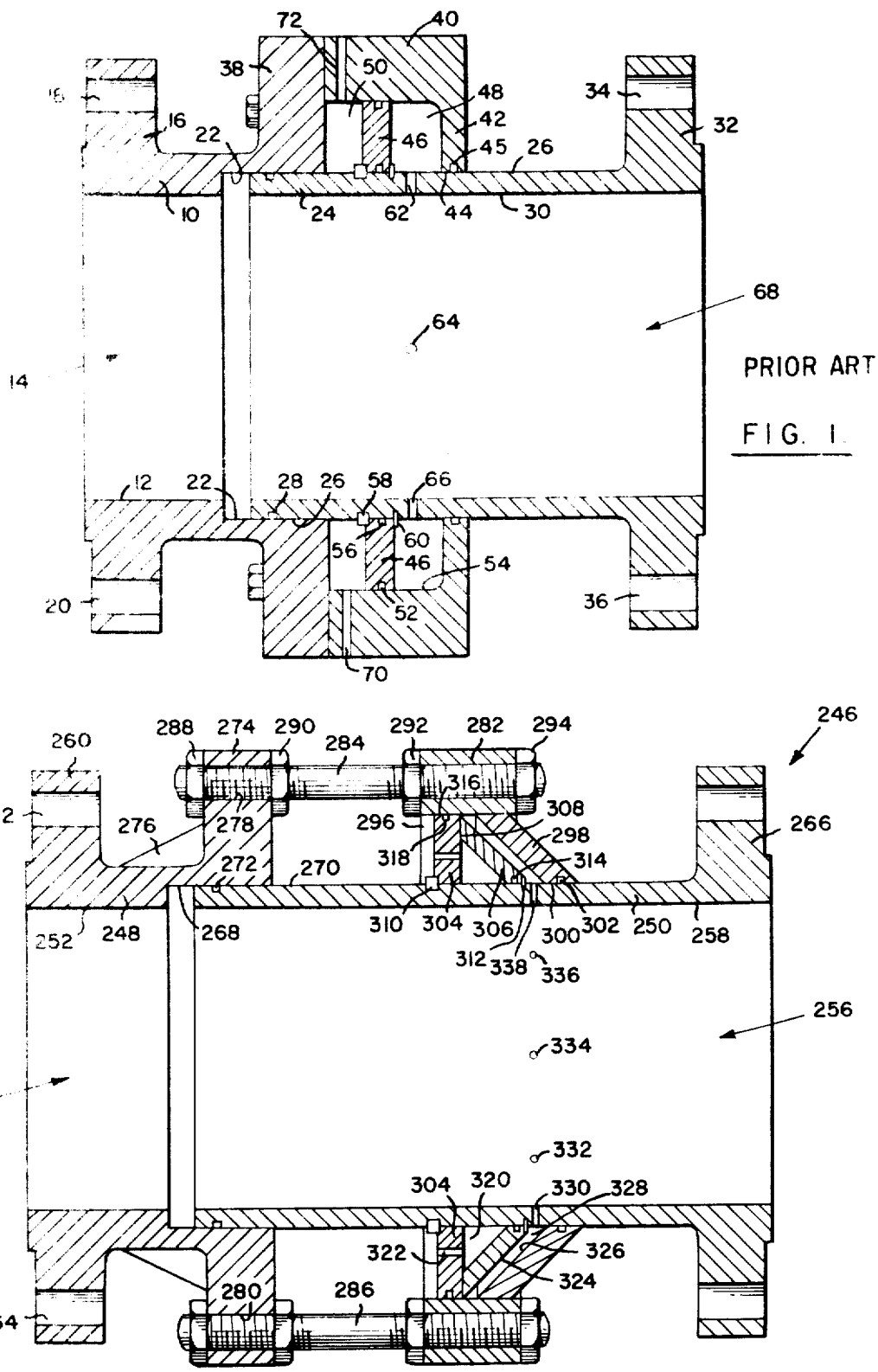
FIG. 1 is an axial section of an expansion joint illustrating the general configuration of the prior art.
FIG. 5 is an axial section of an expansion joint which is suitable for use in joining large pipes.

DETAILED DESCRIPTION OF THE DRAWINGS:

FIG. 1 shows a simple expansion joint which consists of a first annular member 10, having a cylindrical inner surface 12 defining a central passage 14. Member 10 has a first flange 16 with holes 18, 20 and others (not shown) for bolts attaching flange 16 to a similar flange on associated piping. Member 10 has a second cylindrical inner surface 22, which is slightly larger in diameter than cylindrical surface 12. Into the cylindrical opening defined by surface 22, there is fitted a tubular cylindrical member 24. Member 24 is axially slidable in the opening defined by surface 22, and a seal between the outer surface 26 of member 24 and surface 22 is provided by an O-ring 28 which fits in an annular slot provided in surface 26. Member 24 has a cylindrical inner surface 30 which in FIG. 1 is equal in diameter to cylindrical surface 12. At the opposite end of member 24, there is a flange 32 having bolt holes, two of which are indicated at 34 and 36.

Member 10 not only has flange 16, but is also provided at its opposite end with flange 38. A solid outer sleeve 40 is bolted to flange 38. Sleeve 40 has, at the end nearest flange 32, an inwardly projecting ridge 42 having a cylindrical inner surface 44 with a slot containing an O-ring seal 45 which engages surface 26 of member 24. A ring 46 separates the annular space defined by flange 38, member 40, ridge 42 and surface 26 into an annular expansion chamber 48 and an annular chamber 50. The outer surface (as shown in the lower part of FIG. 1) of ring 46 is slotted and provided with an O-ring seal 52, which allows relative sliding between the outer surface of ring 46 and the inner surface 54 of sleeve 40. A similar O-ring seal 56 is provided at the inner surface of ring 46 to prevent leakage between the inner surface of ring 46 and surface 26. Ring 46 is locked against axial movement with respect to member 24 by a split wedge ring 58 and a retaining ring 60. Radial passages in member 24 are provided at 62, 64 and 66 to allow communication of fluid between annular expansion chamber 48 and the inner passage 68 of member 24. Radial vent openings, two of which are shown at 70 and 72, are provided in sleeve 40 for communication between annular space 50 and the atmosphere.

In the structure shown in FIG. 1, it is possible to balance the end-thrust arising from the internal pressure in the central passage 14 with the counteracting force in the expansion chamber 48, by ensuring that the diameter of surface 54 is $\sqrt{2}$ times the diameter of surface 22. With this relationship, the effective area on which the force producing end thrust acts (the radial cross-section defined by surface 22) is equal to the effective area on which the counteracting force acts (the area of the annular cross-section defined by surface 54 and surface 26).

Thus, when the fluid within passage 14 and passage 68 is under pressure, the force which would tend to produce end thrust is counteracted by the joint shown in FIG. 1.

Figure 3:
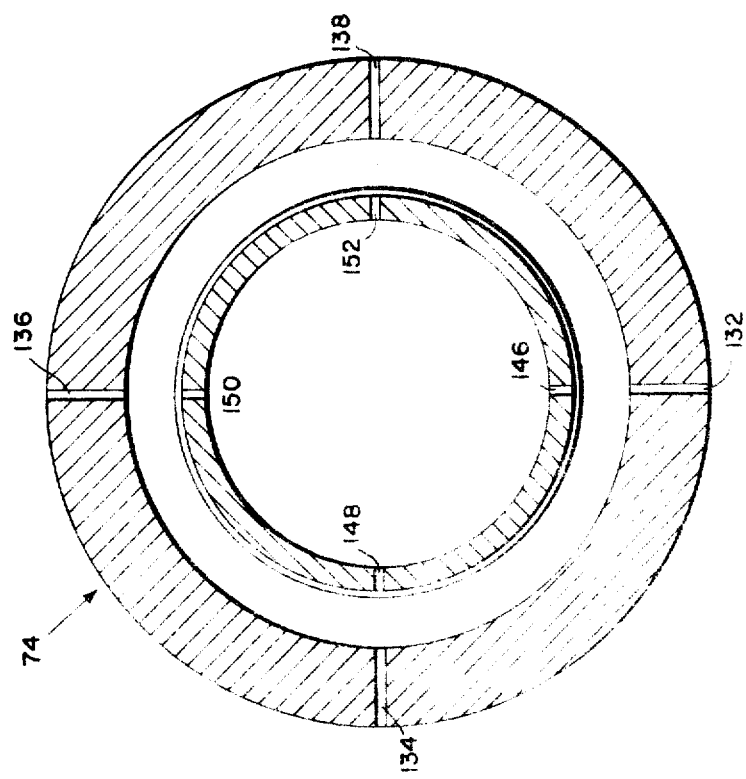
FIG. 3 is a section taken on the surface indicated at 3—3 in FIG. 2.
Figure 2:
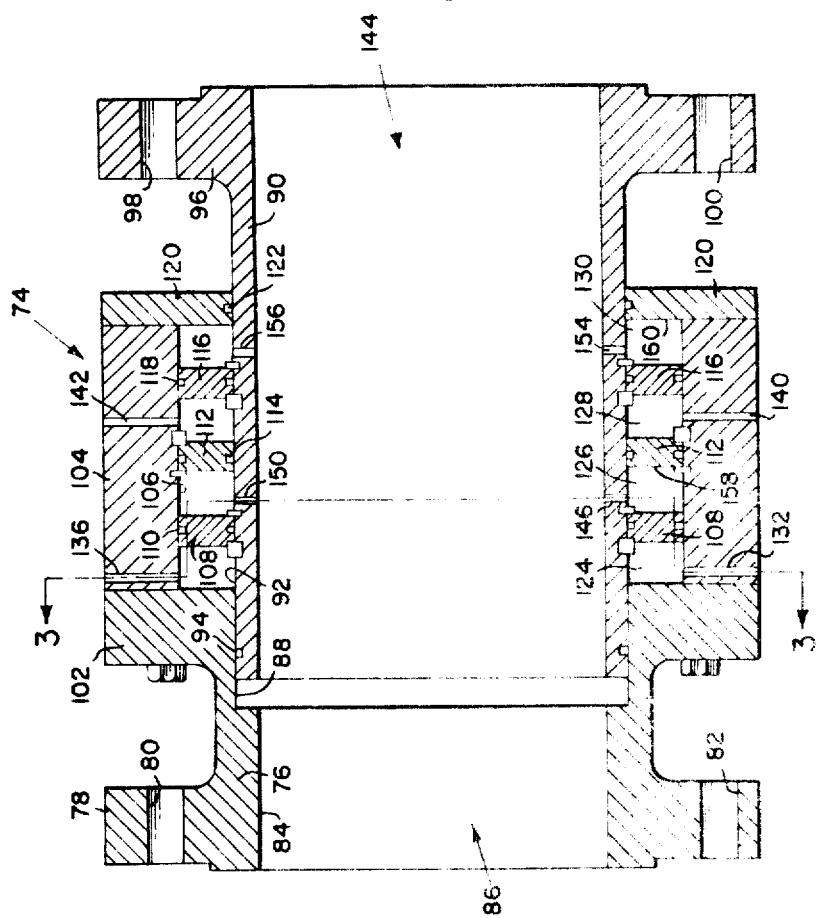
FIG. 2 is an axial section of an expansion joint in accordance with one facet of the invention, having multiple expansion chambers.

FIGS. 2 and 3 show an embodiment of a pressure compensated expansion joint 74 which is particularly suited for use aboard ships or aircraft or wherever space is restricted.

A first annular member 76 has a flange 78 with bolt holes including holes 80 and 82 for connection to a section of pipe or to other fluid-conducting means. Cylindrical inner surface 84 defines a central passage 86 through which fluid can flow. A second cylindrical inner surface 88 is somewhat larger in diameter than surface 84. Into the cylindrical opening defined by surface 88, there is fitted tubular cylindrical member 90, and a seal between the outer surface 92 of member 90 and surface 88 is provided by O-ring 94.

Member 90 is provided with a flange 96 with bolt holes including holes 98 and 100 for connection to associated piping or fluid-conducting means.

Member 76 is provided with an additional flange 102, to which is bolted a solid outer sleeve 104. Sleeve 104 has a cylindrical inner surface 106 which is coaxial and spaced from cylindrical outer surface 92 of member 90. A ring 108 is fixed to surface 92, and is slidable with respect to surface 106, a seal to surface 106 being provided by O-ring 110 in a slot in the outer surface of ring 108. A similar ring 116 is fixed to surface 92, while ring 112 is fixed to surface 106. Each of rings 108, 112 and 116 is fixed to its surface by a split wedge ring and retaining ring, in the same manner in which ring 46 (FIG. 1) is attached to surface 26. Each of these three rings is sealed to the surface to which it is fixed by an O-ring. An inwardly extending flange 120 is bolted to the end of sleeve 104, and its inner surface is slidably sealed to surface 92 by O-ring 122.

Flange 102, rings 108, 112 and 116, and flange 120, along with surfaces 106 and 92 define four separate annular chambers 124, 126, 128 and 130. Chamber 124 is in communication with the atmosphere through vents 132 134, 136 and 138 (FIG. 3). Chamber 128 is in communication with the atmosphere through similar vents including vents 140 and 142 (FIG. 2). Chamber 126 is in communication with the central passage 144 of member 90 through radial passages 146, 148, 150 and 152 (FIG. 3). Chamber 130 is similarly in communication with passage 144 through radial passages 154 and 156 in the wall of member 90.

It will be understood that by ensuring that the diameter of inner surface 106 of sleeve 104 is $\sqrt{1.5}$ times the diameter of surface 92, the effective area on which the force producing end thrust acts (the radial cross-section defined by surface 88) is equal to the effective area on which the counteracting force acts (twice the area of the annular cross-section defined by surfaces 106 and 92). The counteracting forces can be thought of as acting in chambers 126 and 130 against surface 158 of ring 112 and against surface 160 of flange 120.

The use of multiple expansion chambers, such as chambers 126 and 130, permits a decrease in the overall transverse dimensions of the expansion joint, thus allowing the joint to fit into smaller spaces. This is particularly important where a number of pipes are located in a common duct.

Still further reduction in overall dimensions can be achieved by using expansion chambers in numbers greater than two. For example, if three chambers were used, the diameter of the inner surface of the outer sleeve would have to be $\sqrt{1.33}$ times the outer diameter of the member corresponding to member 90 in order to achieve an exact balance. In general, for all circular cylindrical joints, balance is achieved when the inner diameter of the outer sleeve is equal to $\sqrt{1 + 1/N}$, times the outer diameter of the member corresponding to member 90, where N is the number of thrust equalizing chambers. Of course, configurations other than circular cylindrical might be used, but, in order to achieve balance, the dimensional relationship must always be such that the effective area on which end thrust acts is equal to the effective area on which the counteracting force acts.

Figure 4:
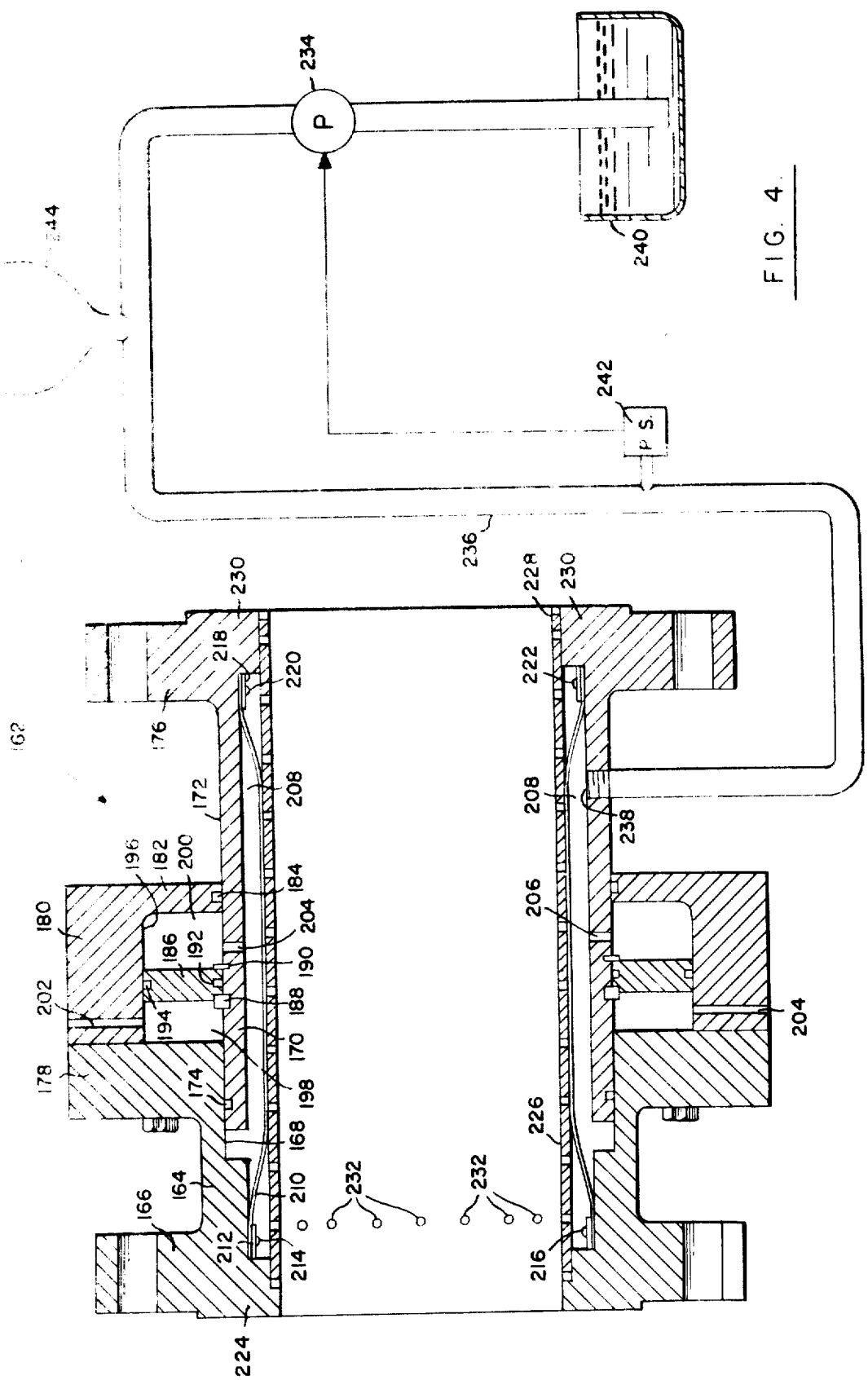
FIG. 4 is an axial section of an expansion joint in accordance with another facet of the invention having a separating diaphragm, shown in conjunction with a schematic drawing of an apparatus for pressurizing an auxiliary fluid which fills the expansion chamber of the expansion joint.

FIG. 4 shows an expansion joint 162 suitable for handling dangerous fluids which must not be allowed to leak out into the atmosphere. The joint 162 comprises a first member 164 having a flange 166 for connection to associated piping or fluid-conducting means. Member 164 has an inner cylindrical surface 168, in which there is slidably fitted a member 170 having a cylindrical outer surface 172. A sliding seal is provided by O-ring 174.

Member 170 is provided at one end with flange 176 for connection to associated piping or fluid-conducting means.

Flange 178 on member 164 has bolted to it a solid outer sleeve 180 with an inwardly extending flange 182 which is slidably fitted to surface 172 and sealed thereto by O-ring 184. A ring 186 is fastened to surface 172 by a split wedge ring 188 and retaining ring 190. An O-ring 192 provides a seal between ring 186 and surface 172.

An O-ring 194 provides a seal between the outer surface of ring 186 and the cylindrical inner surface 196 of sleeve 180.

Ring 186 divides the space defined by flange 178, sleeve 180, flange 182 and surface 172 into a pair of chambers 198 and 200. Chamber 198 is vented to the atmosphere through vents including vents 202 and 204. Chamber 200 is an expansion chamber. It is in communication, through radial openings including openings 204 and 206, with an annular space 208.

Annular space 208 is defined by the inner surfaces of members 164 and 170 and a diaphragm 210 which is tubular in form, and which is fastened at one end to the inner surface of member 164 by retaining strap 212. The retaining strap is fastened to the inner surface of member 164 by screws including screws 214 and 216. The other end of diaphragm 210 is fastened to the inner surface of member 170 by retaining strap 218 which is held in place by screws including screws 220 and 222.

Member 166 has an inwardly extending flange 224 to which there is fastened a tubular member 226. The opposite end 228 of tubular member 226 fits slidably within an opening defined by the inner surface of flange 230 of member 170.

Tubular member 226 is perforated, perforations being shown, for example, at 232.

Annular space 208 is in communication with a liquid supply pump 234 through pipe 236 which is connected to an opening 238 in member 170. Pump 234 delivers liquid, for example oil, from a reservoir 240, through pipe 236 into space 208, and maintains space 208 in a filled condition. An adjustable pressure switch 242 is arranged to sense the pressure within pipe 236, and to control pump 234 to maintain the oil pressure in space 208 at a value slightly higher than the maximum pressure within the piping in which expansion joint 162 is connected. An accumulator is provided in piping 236 at 244.

Instead of pressure switch 242, a differential pressure switch can be arranged to sense the pressure within the piping in which the expansion joint is connected and also to sense the pressure within space 208, and to control the pump to maintain the pressure in space 208 always at a value slightly higher than the pressure within the piping in which the expansion joint is connected.

In operation, a force which counteracts end thrust is produced in annular expansion chamber 200 by the pressure maintained in space 208, which is in communication with expansion chamber 200 through radial passages 204 and 206. The diaphragm 210 isolates the liquid being carried by the pipe from the oil or other liquid within space 208, but allows the relative sliding between the two main parts of the expansion joint which may result from changes in temperature or pressure.

FIG. 5 shows an expansion joint 246 which is particularly suited for use in conjunction with large-diameter piping, in that it makes use of bolts for connecting an outer ring forming the expansion chamber to a flange on one of the main elements, thus effecting a saving in metal and a reduction in weight. The design of the expansion joint 246 is such that its construction is simplified and a minimum number of parts are used.

Expansion joint 246 consists of two main parts 248 and 250. Part 248 has a cylindrical inner surface 252 which defines a central opening 254 aligned with central opening 256, which is defined by a cylindrical inner surface 258 of part 250.

Part 252 has a flange 260 and bolted holes including holes 262 and 264 for connection to piping or other fluid-conducting means. Part 250 has a similar flange 266. Part 248 has a cylindrical inner surface 268 having a somewhat larger diameter than surface 252. A cylindrical outer surface 270 of part 250 fits slidably in the opening defined by surface 268, and a seal between the two surfaces is provided by O-ring 272. The two parts 248 and 250 are thus relatively movable in an axial direction.

Part 248 has a flange 274 at the end opposite flange 260. Flange 274 is reinforced by ribs 276, and has a number of axial bolted holes including holes 278 and 280. An outer sleeve 282 has axial bolted holes matching those in flange 274. Threaded rods including rods 284 and 286 extend through the matching bolted holes in a flange 274 and sleeve 282. Nuts 288, 290, 292 and 294 are threaded into rod 284, and act to hold sleeve 282 in fixed relation to flange 274. The other threaded rods are similarly provided with nuts. Sleeve 282 has a smooth cylindrical inner surface 296. Secured to this surface, near one end of sleeve 282, is a frusto-conical ring 298, having a cylindrical surface 300 at its narrow end in sliding engagement with surface 270 of member 250. A seal is provided by O-ring 302.

An assembly including a ring 304 and a frusto-conical member 306, fastened together at 308, is secured to surface 270 of member 250 by a split wedge ring 310 and a retaining ring 312. A seal between the narrow end of member 306 and surface 270 is provided by O-ring 314. The outer surface 316 of ring 304 is in sliding engagement with surface 296, and a seal is provided at 318. Space 320 is vented to the atmosphere through openings provided in ring 304, including opening 322 (shown in the lower part of FIG. 5).

The annular expansion chamber in expansion joint 246 is located between surface 324 of member 306 and surface 326 of member 298. The expansion chamber is designated 328, and is in communication with inner passage 256 of member 250 through a number of radial passages including passages 330, 332, 334, 336 and 338.

While surface 326 is conical, its effective area is equivalent to that of a planar annulus having an inner diameter equal to the diameter of surface 270 and an outer diameter equal to the diameter of surface 296. Consequently, for exact balance to be achieved, the diameter of surface 296 should be $\sqrt{2}$ times the diameter of surface 270.

To construct joint 246, one slides the assembly of sleeve 282 and member 298 along surface 290 until it approaches flange 266. The assembly of ring 304 and member 206 is then fastened into place, sleeve 282 and member 298 returned approximately to the position in which they are shown, and member 248 is fastened to sleeve 282 by the threaded rods and nuts.

Figure 6:
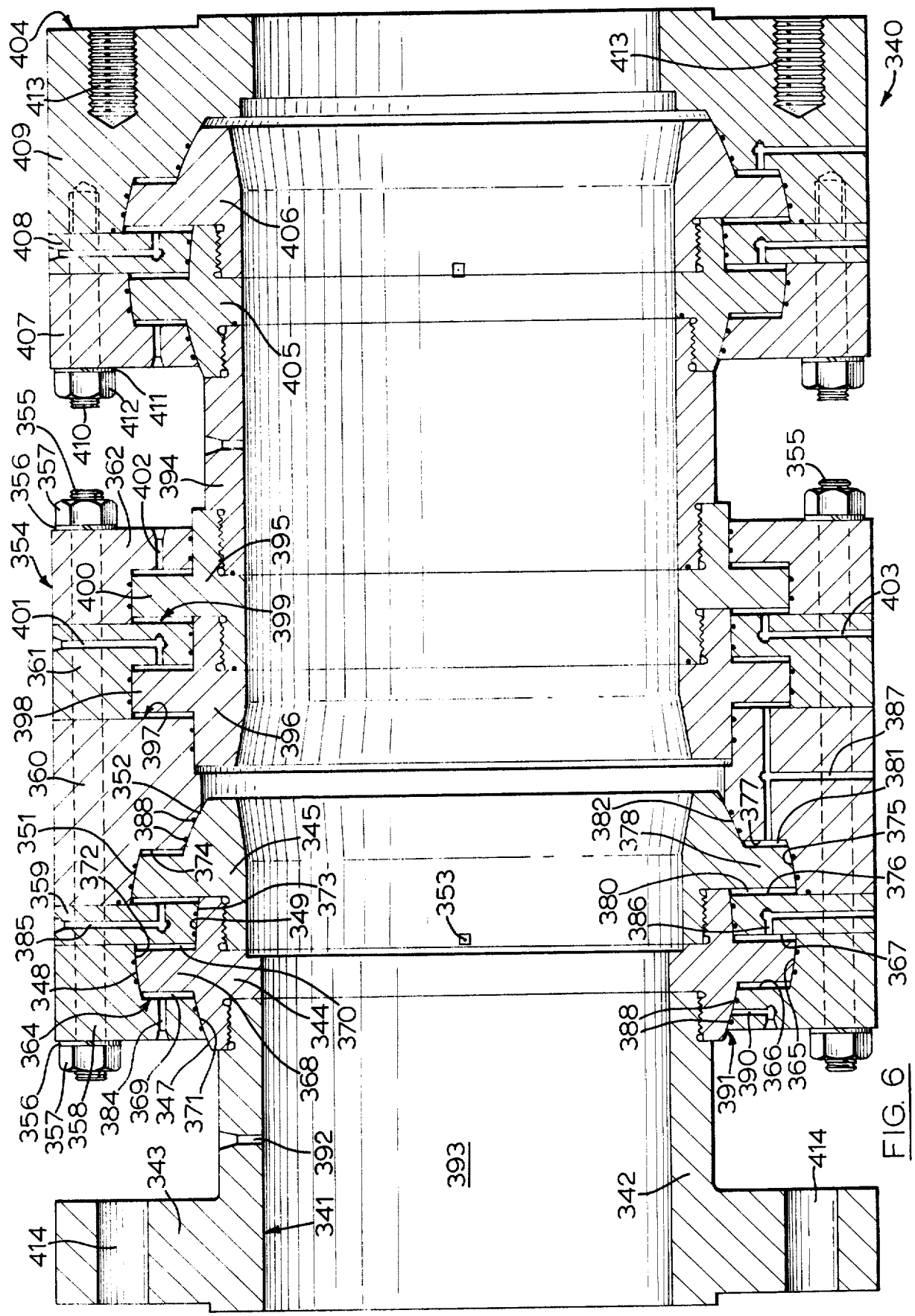
FIG. 6 is an axial section of an expansion and articulating joint in accordance with yet another facet of the invention, incorporating special structure to permit reduction in size of the radial extent of all chambers.

The embodiments of the invention described so far are designed to absorb axial movement, but would be limited in their ability to accommodate lateral displacement, i.e., movement of the axes of the connected piping or fluid-conducting means out of alignment with each other. FIG. 6 shows a piping joint which is capable of accommodating not only longitudinal expansion and contraction, but misalignment as well.

In FIG. 6, the piping joint shown generally at 340 is seen to include a flanged member 341 including a cylindrical section 342 and a radial flange 343. Threadably secured to the rightward end of the flanged member 341 is a first annular member 344, while threadably secured in turn to the first annular member 344 is a second annular member 345. As can be seen in FIG. 6, the first annular member 344 defines three spherical surfaces 347, 348 and 349 while the second annular member 345 defines two spherical surfaces 351 and 352. All five of the spherical surfaces 347, 348, 349, 351 and 352 are concentric about a hypothetical point identified by the number 353.

Next will be described a composite member shown generally at 354, which is held together by a plurality of threaded shafts 355 spaced peripherally about the piping joint 340, each shaft 355 having a split washer 356 and a threaded nut 357 fixed to either end.

The composite member 354 includes a first component 358, a second component 359, a third component 360, a fourth component 361 and a fifth component 362.

As can be seen, the first and second components 358 and 359 together define a first inwardly opening annular cavity 364 which includes a base 365 and two side walls 366 and 367. The first annular member 344 includes an outwardly projecting flange 368 which is received in the cavity 364 and defines therewith a first annular chamber 369 and a second annular chamber 370.

The first component 358 includes a first inwardly-facing concave spherical surface 371 complementary and in mating relationship with the spherical surface 347, and a second inwardly-facing concave spherical surface 372 complementary and in mating relationship with spherical surface 348. The second component 359 of the composite member 354 defines a third inwardly-facing concave spherical surface 373 complementary and in mating relationship with the spherical surface 349.

It will now be appreciated that the first annular chamber 369 is so disposed that pressure therein will tend to urge the composite member 354 and the flanged member 341 together, i.e. will urge the composite member 354 to the left with respect to the flanged member 341. Conversely, the second annular chamber 370 is so disposed that pressure therein will tend to urge the composite member 354 and the flanged member 341 apart, i.e. will urge the composite member 354 to the right with respect to the flanged member 341.

The second and third components 359 and 360 of the composite member 354 define a second inwardly opening annular cavity 374 having a base 375 and two side walls 376 and 377. The second annular member 345 defines a flange 378 which is received in the second inwardly opening annular cavity 374, and defines therewith a third annular chamber 380 and a fourth annular chamber 381.

The base 375 of the second annular cavity 374 is provided by the third component 360, and constitutes a concave spherical surface complementary and in mating relationship with the second spherical surface 351. The third component 360 also defines a further inwardly facing concave spherical surface 382 complementary and in mating relationship with the spherical surface 352 of the second annular member 345.

It will now be realized that the third annular chamber 380 is so disposed that pressure therein would tend to urge the composite member 354 and the flanged member 341 together, i.e. to urge the composite member 354 to the left with respect to the flanged member 341. Conversely, the fourth annular chamber 381 is so disposed that pressure therein would tend to urge the composite member 354 and the flanged member 341 apart, i.e. would tend to urge the composite member 354 to the right with respect to the flanged member 341.

A first passage 384 is provided in the first component 358 to transmit pressurized fluid to the first annular chamber 369 and a second passage 385 is provided in the second component 359 to transmit pressurized fluid to the third annular chamber 380. In FIG. 6, the pressure transmitting passages 384 and 385 are illustrated at the top of the drawing.

At the bottom in FIG. 6, a first vent 386 communicates the second annular chamber 370 with the ambience, while a T-shaped second vent 387 is adapted to communicate two annular chambers with the ambience, one of which is the fourth annular chamber 381 described above.

It will be noted that all complementary, mating, spherical surfaces are provided with two annular, spaced O-ring seals 388 (for the sake of simplicity, only some of the seals 388 have been identified with numerals in FIG. 6).

As shown at the bottom in FIG. 6, a third vent 390 is provided to vent to the ambience the portions of surfaces 347 and 371 which lie between the two respective O-rings 388. This provision is made in order to avoid leakage of fluid at the location 391.

It is to be understood that any fluid passing out of a vent would be collected in a suitable reservoir.

The flanged member 341 has a radial bore 392, and it is to be understood that suitable connecting piping (not shown) would be supplied to communicate the first and second passages 384 and 385 with the radial bore 392, such that the pressure obtaining within the central fluid passage 393 would be transmitted to the first and third annular chambers 369 and 380.

If desired, a ratio transmitter such as that latter to be described in connection with FIGS. 7 and 8 of this specification could be inserted between the passages 384, 385 and the radial bore 392.

It will thus be realized that by pressurizing the first and third chambers 369 and 380 while simultaneously venting the second and fourth chambers ratio and 381 to the ambience, the composite member 354 and the flanged member 341 are urged toward each other, thus compensating the end thrust tending to separate these two members as a result of the pressure in the fluid passage 393.

Because all of the complementary spherical surfaces between the flanged member 341 and the composite member 354 are concentric about the point 353, pivotal motion of the members 341 and 354 with respect to each other about the point 353 is possible. By arranging for the pressure in the first and third annular chambers 369 and 380 to substantially exactly balance the end thrust arising from the fluid pressure in the fluid passage 393, such pivotal action between the members 341 and 354 can take place with little if any binding at the spherical surfaces.

Looking further to the right in FIG. 6, it will be seen that a cylindrical member 394 is provided, and has a third annular member 395 threaded to its left end, and a fourth annular member 396 in turn threaded to the third annular member 395.

It will further be noted that the third and fourth components 360 and 361 of the composite member 354 together define a third inwardly opening annular cavity 397 in which an annular flange 398 on the fourth annular member 396 is received.

Likewise, the fourth and fifth components 361 and 362 of the composite member 354 together define a fourth inwardly opening annular cavity 399 in which an annular flange 400 on the third annular member 395 is received.

The flanges 398 and 400 cooperate with the third and fourth annular cavities 397 and 399 in exactly the same way as the structure defined above with reference to FIG. 2, and it is considered unnecessary to describe the further portions of this structure in FIG. 6, beyond mentioning that a third and a fourth passage 401 and 402 are provided to transmit pressurized fluid to the annular chambers immediately to the right of the flanges 398 and 400 in FIG. 6, and that a third vent 403 is provided to communicate the annular chamber immediately to the left of the flange 400 with the ambience. The annular chamber immediately to the left of the flange 398 is put into communication with the ambience by way of the already-described T-shaped second vent 387.

At the far right in FIG. 6, there is provided a further articulating, sealed, spherical connection between an end member shown generally at 404 and a fifth and a sixth annular member 405 and 406, the annular member 405 being in threaded connection with the rightward end of the cylindrical member 394, and the annular member 406 being in threaded connection with the annular member 405.

The end member 404 includes a first part 407, a second part 408 and a third part 409, which are held tightly together by means of a threaded shaft 410 to which a split washer 411 and a nut 412 are attached.

The articulating connection shown at the far right in FIG. 6 is essentially identical with that at the left in FIG. 6 between the flanged member 341 and the composite member 354. For this reason, no further detailed description of this connection will be given.

It will be noted that the third part 409 of the end member 404 includes a plurality of tapped bores 413 to facilitate the connection between the end member 404 and a section of pipe.

Likewise, the radial flange 343 at the leftward end of the flange member 341 is provided with a plurality of axial bores 414, to facilitate connection between the flanged member 341 and another section of pipe.

Each of the two spherical, articulating connections in FIG. 6 consist of two of the basic spherical "units" which lie at the heart of the spherical or articulating embodiment of this invention. Each "unit" involves structure on one piping component that defines an inwardly opening annular cavity, and structure on another piping component which defines an outwardly extending flange which is received in the annular cavity and which defines therewith two annular chambers, one on either side of the flange. The outer surface of the flange is in mating spherical engagement with the base of the annular cavity, while two further spherical mating surfaces are defined adjacent either side of the cavity itself. All of the spherical surfaces are concentric to permit mutual rotation about the centre of spherical curvature of the one piping component with respect to the other.

The advantages conferred by this unit, whether single, double or multiple, will be described below immediately after the description of FIG. 9 in which the unit is used singly.

It has been mentioned above, with reference to FIGS. 2 and 3, that a primary purpose of providing multiple expansion chambers is to minimize the outer diameter of the joint. The same advantage is naturally inherent in all three of the individual connections shown in FIG. 6. Another means of minimizing the outer diameter of a joint, which is particularly useful with very large diameter pipes, is to utilize a ratio transmitter between the central fluid passage and the expansion chamber or chambers. This possiblity has already been briefly mentioned in connection with the description of FIG. 6 above, but will now be more fully examined with reference to FIGS. 7 and 8, to which attention is now directed.

Figure 7:
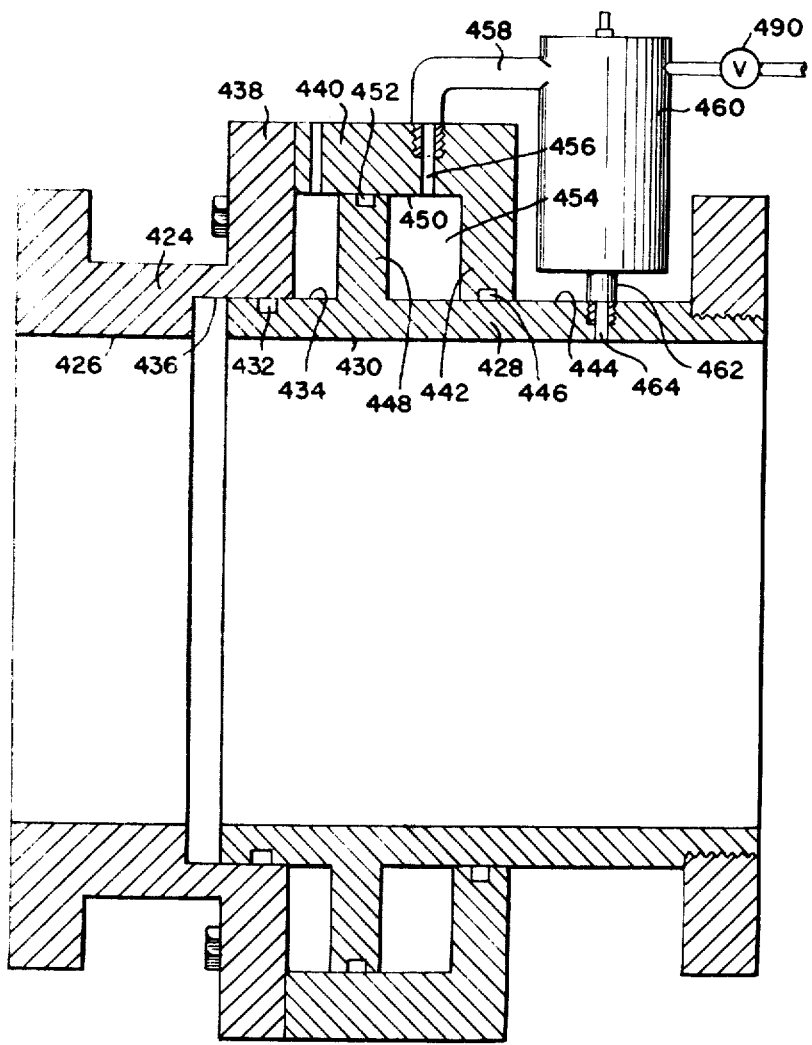
FIG. 7 is an axial section of an expansion joint having a ratio transmitter connected between the fluid passage and the expansion chamber.

The expansion joint in FIG. 7 consists of a first flanged member 424 having a fluid passage 426, and a second flanged member 428 having a fluid passage 430 aligned with passage 426. O-ring 432 provides a seal between cylindrical surface 434 of member 428 and cylindrical surface 436 of member 424. These surfaces are allowed to slide relative to each other. An outwardly extending flange 438 of member 424 is connected by bolts to a sleeve 440 having an inwardly extending flange 442 in sliding, sealed relation with outer surface 444 of member 428, a seal being provided by O-ring 446. An outwardly extending flange 448, integral with member 428, slidably engages the inner surface 450 of sleeve 440, and a seal is provided by O-ring 452. Flanges 442 and 448, and surfaces 444 and 450 define annular expansion chamber 454.

A radial opening 456 in sleeve 440 connects the expansion chamber to a port 458 of ratio transmitter 460. The other port 462 of the ration transmitter is connected to the fluid passage within member 428 through transverse opening 464.

Figure 8:
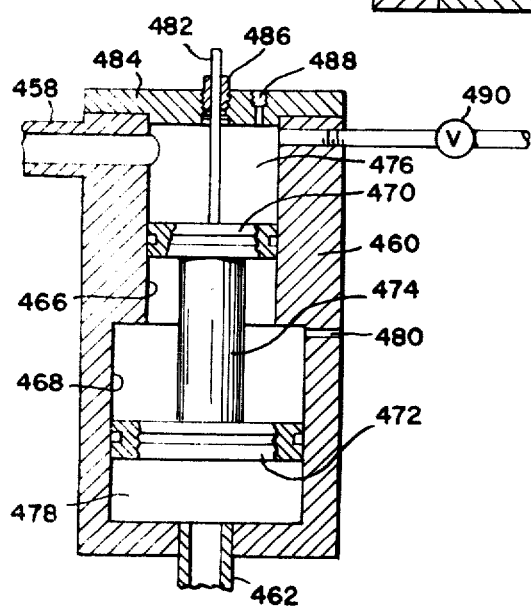
FIG. 8 is an axial section of a ratio transmitter.

FIG. 8 shows the details of ratio transmitter 460, which consists of coaxial cylinders 466 and 468, cylinder 468 being larger in diameter than cylinder 466. A piston 470 is slidable in cylinder 466, and a piston 472 is slidable in cylinder 468. These pistons are connected rigidly to each other by rod 474. Port 458 is in communication with the space 476 above piston 478, and port 462 is in communication with space 478 below piston 472. A vent 480 opens the space between the pistons to the atmosphere. A tell-tale 482 is connected to piston 470, and passes through end plate 484 of the ratio transmitter through a seal 486. A threaded opening 488 is provided in end plate 484 for connection to a vent cock. The thrust-transmitting fluid is replenished through check valve 490

The higher pressure produced at port 458 of the ratio transmitter will cause a large counteracting force to be produced in the expansion chamber 454, even though the effective area of chamber 454 is relatively small compared to the cross-section of the fluid passage through the expansion joint of FIG. 7. Thus, with the use of the ratio transmitter connected as shown, the dimensions of flange 442 and the other elements defining the expansion chamber can be reduced. This results in a substantial saving of materials, particularly in expansion joints of large size. The ratio transmitter (FIG. 8) can be used with expansion joints of the type shown in FIG. 4, with port 458 connected to the expansion chamber 200 (FIG. 4), and port 462 connected either to chamber 208 outside the diaphragm 210, or to the fluid passage.

Figure 9:
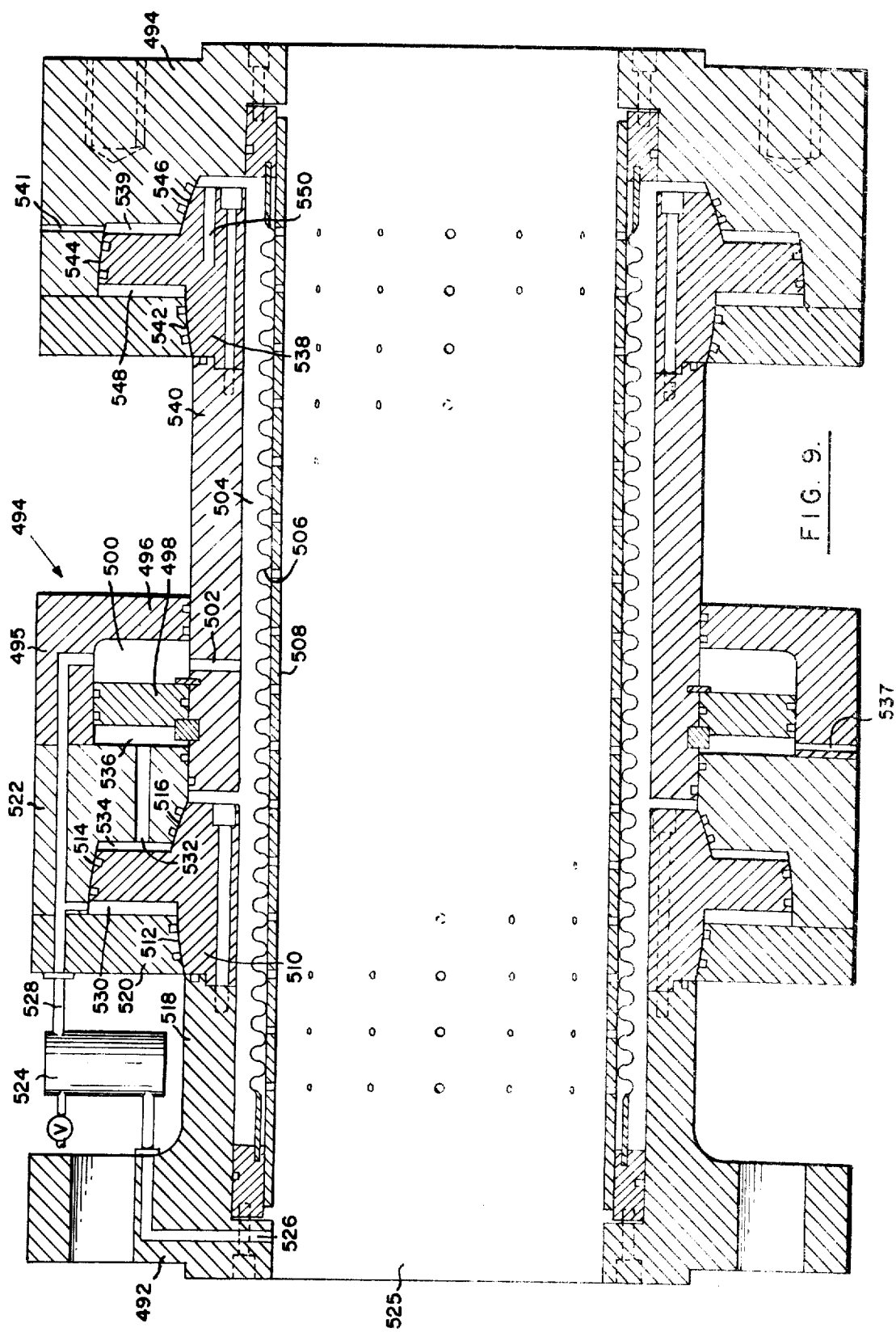
FIG. 9 is an axial section of an expansion and articulating joint which includes diaphragm means.

FIG. 9 shows an expansion joint having a built-in universal capable of accommodating considerable misalignment, both lateral and angular, of the connected pipes and particularly suitable for handling dangerous fluids which must not be allowed to leak into the atmosphere. The joint in FIG. 9 is similar to that shown in FIG. 6, except that each spherical, articulating connection uses only a single unit as described earlier with reference to FIG. 6.

The assembly consists of a pair of interconnected flanges 492 and 494 adapted to be attached to pipe sections to be connected. The interconnection between the flanges includes an expansion joint 494, similar to that shown in FIG. 7. It consists of a sleeve 495 having an inwardly extending annular member 496, both cooperating with a cylindrical member 540 and an outwardly extending annular member 498 to define an annular expansion chamber 500.

Chamber 500 communicates, through radial passage 502, with a space 504 surrounding a flexible bellows 506. The bellows is connected at one end to flange 492, and at the other end to flange 494. Space 504, passage 502 and chamber 500 contain a suitable pressure-transmitting fluid such as oil. A thin, flexible, perforated sleeve 508 extends from one flange to the other inside the bellows. Sleeve 508 slidably engages the inside surface of the flanges, allowing relative axial movement between the flanges, and its flexibility allows lateral and angular movement between the flanges.

Member 510 has three convex spherical surfaces 512, 514 and 516. It is bolted to cylindrical member 518, which is integral with flange 492. Spherical surface 512 is in mating engagement with concave spherical surfaces of member 520, and surfaces 514 and 516 are likewise in mating engagement with concave spherical surfaces of member 522. Suitable O-ring seals are provided in grooves in the spherical surfaces wherever necessary to prevent fluid leakage.

A ratio transmitter 524, similar to the ratio transmitter shown in FIG. 8, is connected to the fluid passage 525 through passage 526. Passage 526 is connected to the larger of the two cylinders within the ratio transmitter. The smaller of the two cylinders in the ratio transmitter is connected through passage 528 to expansion chamber 500, and also to space 530 between the inner wall of member 520 and the opposing wall of member 510.

The ratio transmitter is preferably designed with the area of its smaller piston only slightly less than the area of its larger piston so that the pressure of the pressure transmitting fluid will be maintained only slightly higher than the pressure of the fluid in the fluid passage. The purpose is to prevent leakage of the fluid in the fluid passage through the seals. A typical pressure differential would be, for example, 1 psi.

An equalizing port 532 interconnects space 534 on the right-hand side of member 510 with space 536 on the left-hand side of member 498.

A second coupling member 538 is bolted to cylindrical member 540. Like coupling member 510, member 538 has three convex spherical surfaces 542, 544 and 546, each in mating engagement with concave spherical surfaces provided in flange 494 Space 548 contains pressure transmitting fluid, and is in communication with space 504 through passage 550. The expansion joint in FIG. 9 not only compensates for end thrust, but its two universal joints allow lateral and angular displacement between the connected pipes. The fluid pressure in spaces 530 and 548 also counteracts the effects of the end thrust, and prevents a thrust from existing at the spherical seats. Chambers 532 and 536 and chamber 539 is vented to atmosphere through vent hold 541.

It should be noted that spherical surfaces 512, 514 and 516 have a common center, as have spherical surfaces 542, 544 and 546.

It will now be realized that each of the universal joints shown in FIG. 9 includes a single unit as described earlier in connection with FIG. 6. Thus, members 520 and 522 together define an inwardly-opening annular cavity into which a flange-like portion of member 510 extends whereby the two annular spaces 530 and 534 are defined. This unit has several clear advantages over prior art constructions, such as that disclosed in the afore-mentioned U.S. Pat. No. 3,454,288, Mancusi, Jr. In particular, the prior art as exemplified by Mancusi, Jr. fails to provide the equivalent of the inwardly opening annular cavity of this invention, and thus fails to provide two annular chambers or spaces, one on either side of a radial flange extending into the annular cavity. In the prior art construction, the vented annular chamber of this invention is absent, and instead a single spherical bearing surface (with suitable seals) is provided in place of, for example, the surfaces 514 and 515 in FIG. 9 of the attached drawings. This single spherical surface must of necessity be of considerable extent, because it must continue inwardly to a diameter approximating that of the central fluid passage. Failure to continue inwardly to this point would mean that the spherical surface would terminate at some radius intersecting the pressurized chamber (space 530 in FIG. 9 of this application), and would thereby negate at least a part of the function of the pressurized chamber.

One of the primary advantages of this invention over the prior art construction as exemplified by Mancusi, Jr. is the smaller bulk, smaller weight, and resulting smaller cost of manufacturing the structure to which this application is directed. More importantly from a technical point of view, however, is the fact that indeterminate pressure profiles along the spherical contacting surfaces are kept to an absolute minimum in the structure of this invention, while the prior art constructions, as exemplified by Mancusi, Jr., include a very large spherical surface area over which the pressure profile can only be determined by trail and error. This is so because any two complementary mating spherical surfaces naturally ride against each other with a very close tolerance, and fluid escaping along this surface will have a diminishing pressure from its point of entry to its point of exit. This pressure profile, however, is indeterminate and therefore prohibits the calculation of the true axial thrust component resulting from pressure between the mating spherical surfaces. Hence, the selection of a proper size for the pressure chamber in the prior art corresponding to the pressure chamber 530 in FIG. 9 is of necessity a matter of trail and error.

By contrast, in the structure disclosed herein, and referred to above as the spherical articulating joint unit (involving an inwardly opening annular cavity and a flange received in that cavity and defining therewith two annular chambers, one on either side of the flange), the surfaces where the pressure profile is indeterminate are greatly reduced, and are in large measure replaced by the vented chamber (for example space 534 in FIG. 9), in which the pressure is very clearly the same as the ambience, and is thus fully known. Such structure permits a much greater degree of accuracy in the calculation of the dimensions required to produce balancing of the axial thrust forces exerted between the pipe sections being connected.

It will further be realized that, by reducing the extent of the mating spherical surfaces in contact, the frictional forces resisting articulation between the two jointed members will be reduced.

Each of the embodiments of the invention described herein is suitable for absorbing changes in piping length resulting from temperature changes and pressure changes, particularly in high pressure piping. It will be apparent that any number of these expansion joints may be used in a given pipe, that the passages and expansion spaces need not be of any particular shape, and that various other structural modifications can be made. Moreover, several of the piping joints shown in the drawings have the additional capability of accommodating misalignment between the sections of pipe being joined, the universal joint structure being itself thrust-compensated, and incorporating one or more units as defined above, such units exhibiting clear advantages over conventional thrust-compensated swivel couplings as exemplified by Mancusi, Jr.

It will further be clear that, while this invention is eminently suited to high-pressure applications, it could also be used with advantage in low-pressure or vacuum applications.

It should also be pointed out that certain piping applications may be encountered in which it is desired that a moderate degree of imbalance be provided in the coupling so that it tends to expand somewhat more easily than to compress, or vice-versa.

What is claim is:

1. A compensated expansion joint for high pressure piping comprising:
   first and second fluid conductors arranged in communication with each other to provide a fluid passage,
   means providing a seal permitting sliding of said conductors relative to each other in the direction of flow, but preventing the escape of fluid at the connection between them,
   means providing a plurality of expansible chambers each having first and second relatively movable parts,
   means providing a direct pressure relationship between said fluid passage and the interior of the chambers,
   means fastening the first conductor to said first part of each of said plurality of expansible chambers and means fastening the second conductor to said second part of each of said plurality of expansible chambers so that said conductors are pulled toward each other as the expansible chambers expand.

2. A compensated expansion joint according to claim 1 in which said expansible chambers are annular in shape and surround the fluid passage.

3. A compensated expansion joint for high pressure piping comprising:
   first and second fluid conductors arranged in communication with each other to provide a fluid passage, the second conductor having a cylindrical outer surface,
   means providing a seal permitting sliding of said conductors relative to each other in the direction of flow, but preventing the escape of fluid at the connection between them,
   an annular sleeve fixed with respect to the first fluid conductor, the annular sleeve having a cylindrical inner surface with a cross-sectional area greater than that of the outer surface of the second conductor,
   at least two integral inwardly extending annular ridges on said annular sleeve,
   means providing a seal between said ridges and the outer surface of the second conductor while allowing relative sliding therebetween,
   at least two outwardly extending ridges on said second fluid conductor, each arranged on the side of one of said inwardly extending ridges so as to form a number of annular chambers which expand when the fluid conductors move toward each other, the number of said annular chambers being equal to the number of said outwardly extending ridges,
   means providing a seal between said outwardly extending ridges and the cylindrical inner surface of the annular sleeve while allowing relative sliding therebetween, and
   means providing a direct pressure relationship between the fluid passage and the said annular chambers.

4. A compensated expansion joint according to claim 1, in which the total effective area of the said chambers is substantially equal to the effective area of the fluid passage, and in which said means providing a direct pressure relationship is a plurality of passageways connecting the said chambers to the fluid passage.

5. A compensated expansion joint according to claim 3 in which cylindrical inner surface of the annular sleeve and the cylindrical outer surface of the second conductor are both circular, in which the means providing a seal permitting sliding of said conductors is located substantially at the diameter of said cylindrical outer surface and in which the diameter of the said inner surface is $\sqrt{1 + N^{1}}$ times the diameter of said cylindrical outer surface, N being the number of the said annular chambers.

6. A pressure compensated articulated joint for piping, comprising:
   first and second fluid conductors arranged with their ends connected articulably to each other to provide a fluid passage,
   the first fluid conductor having means defining an inwardly opening annular cavity with a base and two side walls,
   the second fluid conductor having an outwardly projecting flange received in said cavity and defining therewith a first and a second annular chamber, one on either side of said flange,
   concentric spherical bearing and sealing means between the flange and said base and between the second fluid conductor and the portion defining said two side walls,
   said first annular chamber being so disposed that pressure therein would urge said fluid conductors together, said second annular chamber being so disposed that pressure therein would urge said fluid conductors apart,
   means providing a direct pressure relationship between said first annular chamber and said fluid passage,
   and a vent connecting said second annular chamber with the ambience, the first fluid conductor having further means comprising a base and a third side wall, the base, the third side wall, and one of said two side walls defining a further inwardly opening annular cavity, the second fluid conductor having a further outwardly projecting flange received in said further cavity and defining therewith a third and fourth annular chamber, one on either side of said further flange, concentric spherical bearing and sealing means between said further flange and the base of said further cavity, and between the second fluid conductor and the portion defining the third side wall of said further cavity, said third annular chamber being so disposed that pressure therein would urge said fluid conductors together, said fourth annular chamber being so disposed that pressure therein would urge said fluid conductors apart,
   further means providing a direct pressure relationship between said third annular chamber and said fluid passage,
   and a further vent connecting said fourth annular chamber with the ambience.

7. An articulated joint for high-pressure piping comprising:
   first and second fluid conductors arranged with their ends connected with each other to provide a fluid passage,
   said first fluid conductor having a first, external, convex spherical surface and a flange located nearer than said first spherical surface to the end of the first conductor which is connected with the second conductor, said flange extending outwardly beyond the first spherical surface and having at its periphery a second convex spherical surface concentric with the first convex spherical surface,
   said second fluid conductor having a first internal concave spherical surface in mating relationship with the second convex spherical surface, and an inwardly extending flange having a second concave inner surface in mating relationship with the first convex spherical surface of the first fluid conductor, said first convex spherical surface and the second concave inner surface of the inwardly extending flange being so disposed as to resist separation of said conductors from each other,
   said flange providing between them a first annular chamber,
   means providing a direct pressure relationship between said first annular chamber and the fluid passage whereby the force of the first convex spherical surface against the second concave inner surface of the inwardly extending flange is counteracted by the pressure of fluid within said first annular chamber, said first fluid conductor having a third convex spherical surface located nearer than said outwardly extending flange to the end of the first fluid conductor which is connected with the second fluid conductor, the third convex spherical surface being concentric with said first convex spherical surface and having a smaller radius of curvature than said second convex spherical surface, said second fluid conductor having an inwardly extending portion which has a third concave inner surface in mating relationship with said third convex spherical surface, the inwardly extending portion defining with said outwardly extending flange a second annular chamber, means venting said second annular chamber to the ambience, a further flange extending from said first fluid conductor and located nearer than said third convex spherical surface to the end of the first fluid conductor which is connected with the second conductor, the further flange extending outwardly beyond the third convex spherical surface concentric with the first convex spherical surface, a fifth convex spherical surface on said first fluid conductor and located nearer than said further flange to the end of the first fluid conductor which is connected with the second condutor, the fifth convex spherical surface being concentric with the first convex spherical surface and having a smaller radius than said forth convex spherical surface, an annular, inwardly opening cavity in said second fluid conductor having a base, a first side wall adjacent said third concave inner surface, and a second side wall, said base including a fourth concave inner surface in mating relationship with said fourth convex spherical surface, a fifth concave inner surface adjacent said second side wall in mating relationship with said fifth convex spherical surface, said further flange and said first side wall providing between them a third annular chamber, said further flange and said second side wall providing between them a fourth annular chamber, further means providing a direct pressure relationship between said third annular chamber and the fluid passage, and means venting said fourth annular chamber to the ambience.

* * * * *